(12) United States Patent
Marquardt

(10) Patent No.: US 12,382,853 B2
(45) Date of Patent: Aug. 12, 2025

(54) CLUTCHED DRIVELINE FOR WINGS ON FLEX WING CUTTER

(71) Applicant: Oregon Tool, Inc., Portland, OR (US)

(72) Inventor: Brandon Joel Marquardt, Portland, OR (US)

(73) Assignee: Oregon Tool, Inc., Portland, OR (US)

( * ) Notice: Subject to any disclaimer, the term of this patent is extended or adjusted under 35 U.S.C. 154(b) by 0 days.

(21) Appl. No.: 18/750,101

(22) Filed: Jun. 21, 2024

(65) Prior Publication Data

US 2024/0341217 A1 Oct. 17, 2024

Related U.S. Application Data

(63) Continuation of application No. 17/492,374, filed on Oct. 1, 2021, now Pat. No. 12,041,866.

(60) Provisional application No. 63/087,106, filed on Oct. 2, 2020.

(51) Int. Cl.
*A01B 71/06* (2006.01)
*A01D 34/66* (2006.01)
*A01D 34/76* (2006.01)

(52) U.S. Cl.
CPC .......... *A01B 71/066* (2013.01); *A01D 34/661* (2013.01); *A01D 34/76* (2013.01)

(58) Field of Classification Search
CPC ..... A01B 71/066; A01D 34/661; A01D 34/76
See application file for complete search history.

(56) References Cited

U.S. PATENT DOCUMENTS

| | | | |
|---|---|---|---|
| 2,974,469 A | | 3/1961 | Smith et al. |
| 3,473,302 A | * | 10/1969 | Clay ................. A01D 34/661 |
| | | | 56/6 |
| 3,731,469 A | | 5/1973 | Akgulian et al. |
| 4,538,400 A | | 9/1985 | Hottes |
| 5,113,640 A | | 5/1992 | Colistro |
| 5,321,938 A | * | 6/1994 | LeBlanc ............ A01D 34/661 |
| | | | 56/14.7 |
| 7,313,902 B1 | | 1/2008 | Eavenson, Sr. et al. |
| 11,477,938 B2 | | 10/2022 | Samet et al. |
| 11,716,927 B2 | | 8/2023 | Samet et al. |
| 2005/0279072 A1 | | 12/2005 | Sarver et al. |
| 2008/0141640 A1 | | 6/2008 | Wehler et al. |
| 2013/0291512 A1 | | 11/2013 | Gonzalez |
| 2015/0223397 A1 | | 8/2015 | Browning et al. |
| 2017/0071126 A1 | | 3/2017 | Eubanks |
| 2019/0063565 A1 | | 2/2019 | McLane |
| 2019/0313578 A1 | | 10/2019 | Carlson |

(Continued)

OTHER PUBLICATIONS

Woods Batwing Rotary Cutter 3180-3 3180Q-3 2120-3 2020Q-3, Operators Manual, MAN0200 Rev. Aug. 19, 2010.

(Continued)

*Primary Examiner* — Abigail A Risic
(74) *Attorney, Agent, or Firm* — Foley & Lardner LLP

(57) ABSTRACT

A tractor implement configured to be towed by a tractor includes a gearbox comprising an input shaft and an output shaft, a mechanical clutch coupled to the gearbox, an actuator coupled to the mechanical clutch, and a driveline coupled to the gearbox via the mechanical clutch. The actuator is controllable to move the mechanical clutch to selectively engage and disengage the output shaft with the driveline.

20 Claims, 3 Drawing Sheets

(56) References Cited

U.S. PATENT DOCUMENTS

2022/0117154 A1    4/2022  Steen

OTHER PUBLICATIONS

Woods Mow'n Machine, FZ23B FZ28K, Serial No. 1177489 & Up, Operators Manual, MAN0875 Rev. Aug. 15, 2016.
Woods Rotary Mower, Model F35 H235-3 for Case-IH 234 & 235, Model F35 M180-3 For Mitsubishi MT180, MT180H, MT180HM & MT180HMD, Operator's Manual, F-7501 Rev. May 2, 2000.

* cited by examiner

CLUTCHED DRIVELINE FOR WINGS ON FLEX WING CUTTER

CROSS-REFERENCE TO RELATED APPLICATION

This application is a continuation of U.S. Ser. No. 17/492,374, filed Oct. 1, 2021, which claims the priority benefit of the earlier filing date of U.S. Provisional Application No. 63/087,106, filed Oct. 2, 2020, both of which are hereby incorporated herein by reference in their entireties.

TECHNICAL FIELD

The present disclosure relates to the field of powered implements and associated vehicles, e.g. tractors, mowers, etc., and specifically to a clutched driveline configuration for flex wing cutters.

BACKGROUND

Powered implements are a common fixture on many parcels of land that are either undeveloped, landscaped into an expansive lawn, or used for agricultural purposes. For parcels that are left undeveloped and are not suitable for agriculture, or are intended to be a lawn, such as median strips around highways, or areas that are left open, such as park spaces and common areas around business parks, periodic mowing of the parcels is required to prevent overgrowth. For large, multi-acre parcels, a lawn tractor or tractor fitted with a mowing implement is often employed. The mowing implement is typically configured to cut a relatively wide swath, often in excess of ten feet in width.

Mowing implements with comparatively wide decks may be unable to successfully or easily negotiate a particularly uneven parcel, such as if the parcel has dips and/or ridges that are smaller than the mower deck. As a general principle, the wider the mower deck, the less capable the mower deck will be to handle uneven surfaces and/or the higher the mower deck must cut to clear any surface irregularities. Thus, mower decks are inherently limited by their width in the extent to which they can handle rough terrain for a desired cutting height, with wider decks requiring greater cutting height. Furthermore, wide decks that exceed the wheelbase or width of the towing implement may be difficult to store due to the footprint of the deck. One solution to this problem is to employ a flex wing cutter, where one or more sections of the mower deck can be raised or lowered, effectively reducing the width of the mower deck, allowing a lower cut height and better maneuverability over rough terrain.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

Figure 1:
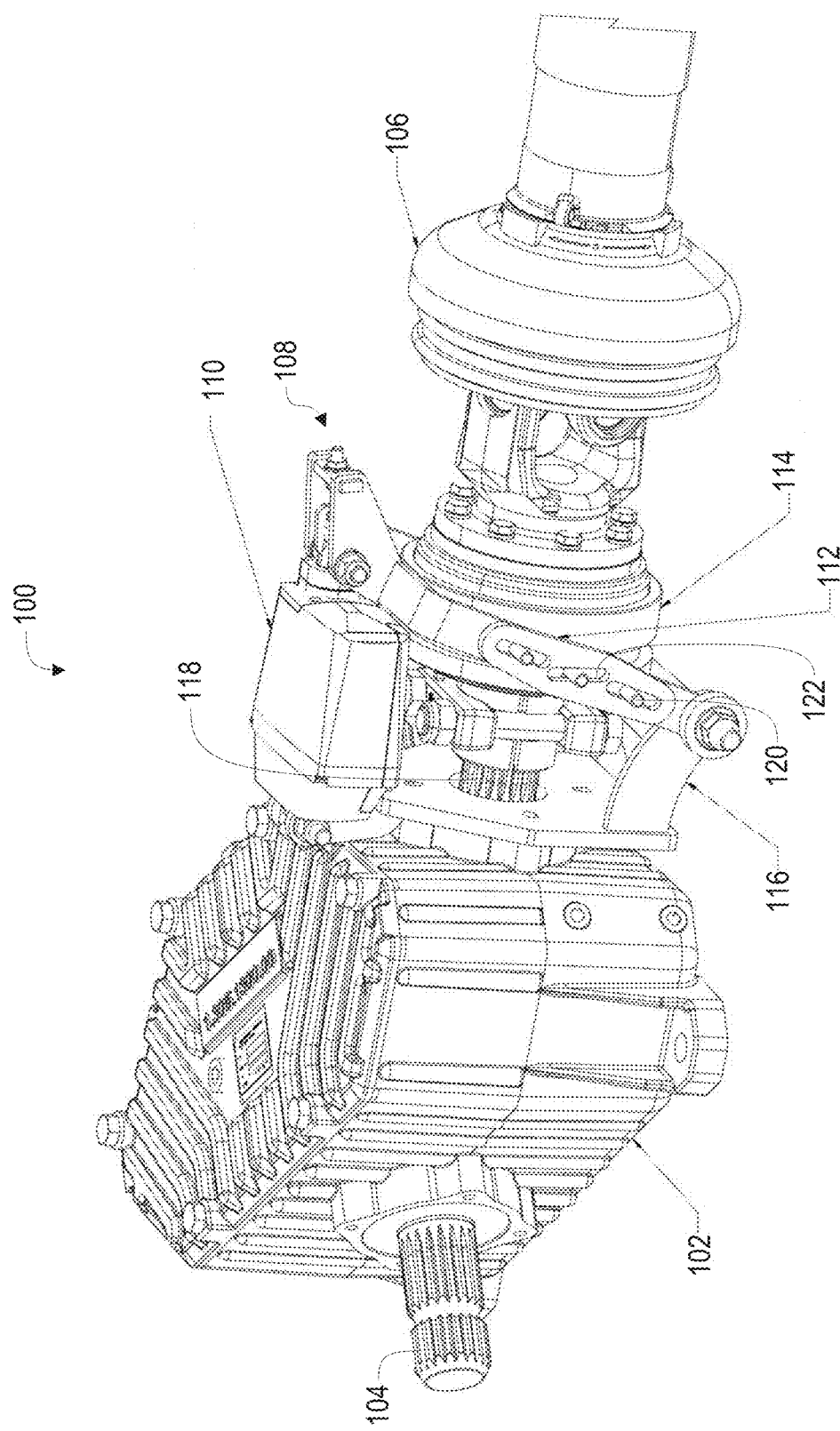
FIG. 1 illustrates a perspective view of a clutched driveline mechanism for a flex wing cutter, in accordance with various embodiments.

In the following detailed description, reference is made to the accompanying figures which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A) B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

To facilitate the ability to retract or fold up the mower deck segments, e.g., wings, of a flex wing mower, each wing as well as the center deck portion is typically equipped with a separate set of rotary cutting blades, which requires that each segment be separately driven. In mechanical implementations, this has typically been accomplished using a series of gearboxes and separate drivelines. A single main driveline is typically connected to the power take-off (PTO) of a towing vehicle, e.g., tractor, which feeds into a splitter gearbox. The splitter gearbox splits the mechanical rotation of the PTO into two or more additional take-offs that may diverge directionally. Each additional take-off in turn is coupled to a drive gearbox on each wing, which is coupled to and drives each wing's cutting blades. The splitter gearbox may also be coupled to and drive the center section's cutting blades.

When one of the wings of a flex wing cutter is lifted or folded, power to at least the cutter in the lifted or folded wing should be removed for safety prior to the wing being lifted, as the cutting blades may be exposed. Existing solutions require the operator of the tractor or other towing vehicle to manually disconnect the wing to be lifted, and possibly manually lift the wing following disconnection. Where manual disconnection is required, the operator typically must stop the tractor, exit the operator cab, and tend to disconnection on the implement, which adds time to job completion.

Some known solutions employ a hydraulic drive system, rather than mechanical connections, where each cutting blade assembly may be separately powered via a hydraulic line. The flex wing cutter can receive power from pressurized hydraulic fluid from the tractor directly, via one or more hose couplings. Depending upon the configuration of the various hydraulic circuits on the tractor and available controls, the wing cutting blade assemblies may be remotely controlled from the operator cab. However, compared to a mechanical drive, hydraulic solutions are complex, may increase fuel consumption due to losses in the hydraulic system, are expensive, and can be prone to overheating. If the system overheats, mowing must be discontinued until the hydraulic system cools back down to an acceptable operating temperature.

Embodiments disclosed herein provide a system for remotely selectively disconnecting power to the cutting blades of one or more wings of a flex wing cutter that employs a mechanical drive system. By employing a clutch mechanism for each wing's driveline in conjunction with remote control for clutch engagement/disengagement, each wing can be activated or deactivated entirely from the tractor cab, without requiring the operator to leave the cab. The use of a mechanical driveline avoids the complexities, power losses, potential overheating, and other disadvantages of a hydraulic system.

FIG. 1 discloses an example system 100 for selectively engaging or disengaging the cutting mechanism of a wing on a flex wing cutter. System 100, in the depicted embodiment, includes a splitter gearbox 102. An input shaft 104 on the splitter gearbox 102 is mechanically coupled to a power take off from a tractor or other vehicle that is towing the flex wing cutter. The splitter gearbox 102 transfers at least part of this power to an output shaft 118, which in turn transfers the power to a driveline 106 when engaged by a clutch assembly 108. The clutch assembly 108 is controlled by an actuator 110 for selective engagement/disengagement of the clutch assembly 108. The actuator 110 may be remotely controllable.

Splitter gearbox 102, in embodiments, channels rotational power received from input shaft 104 into at least two output shafts 118. The number of output shafts 118 may depend on the number of wings on an implementing flex wing cutter and/or the number of different sets of cutting blades that are desired to be controlled. In the depicted embodiment, splitter gearbox 102 has two output shafts 118, with the second one not shown, as being hidden behind the body of the splitter gearbox 102. Other embodiments may have more output shafts 118. Splitter gearbox 102 may be implemented using any suitable technique, including any suitable set and type of drive gears, as is now known or later developed.

Splitter gearbox 102, in embodiments, is mounted on a center section of a flex wing cutter that is not subject to being deactivated and folded away. In some embodiments, splitter gearbox 102 may include a downward directed output shaft for directly coupling to a cutting blade assembly on the center section of the flex wing cutter. In other embodiments, the splitter gearbox 102 may only split rotational power, with all cutting blade assemblies being driven by a separate gearbox configured to drive cutting blades. Such implementations may be employed when being able to selectively activate all sets of cutting blades, including the cutting blades in the center section of the flex wing cutter, is desired. Absent such functionality, the center section would only be deactivated when the PTO from the towing vehicle is deactivated, thereby deactivating all parts of an attached flex wing cutter. In still other embodiments, the splitter gearbox 102 may directly drive the center section cutting blades, and be equipped with an internal clutch mechanism to selectively disengage the center section cutting blades.

Input shaft 104, as depicted, is a splined shaft, configured to receive a coupler from a corresponding tractor PTO. In some embodiments, input shaft 104 may be permanently or semi-permanently attached to an implement driveline, similar to driveline 106, which itself is coupled to the tractor or towing implement PTO as the flex wing cutter is coupled to the tractor or towing implement for use. However, input shaft 104 may be configured differently, viz. using other than a splined shaft, depending upon the configuration of the tractor PTO coupler or implement driveline, or other implement or means used to provide power to input shaft 104.

Figure 2:
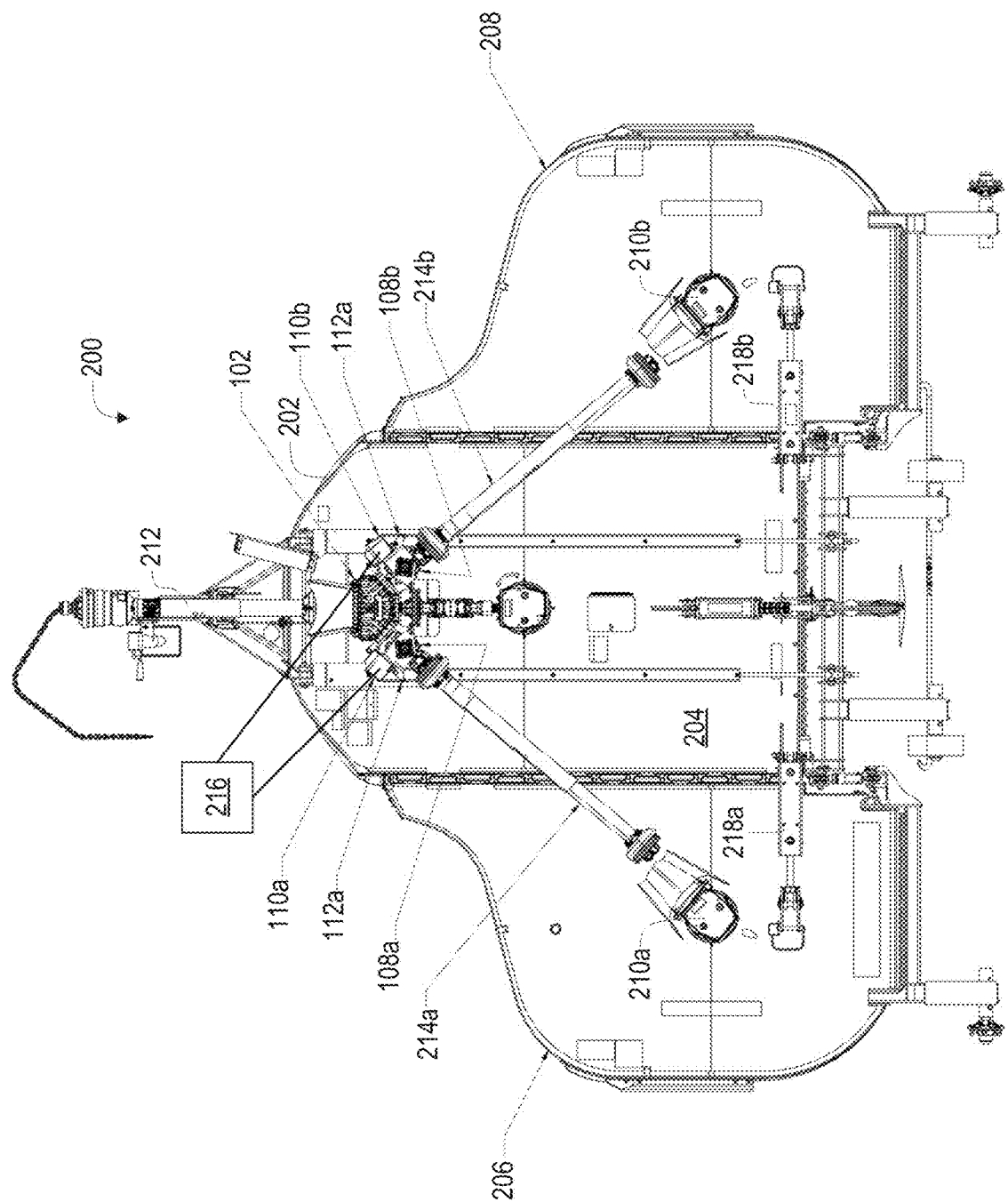
FIG. 2 illustrates an overhead diagram view of the components of a flex wing cutter implementing an example clutched driveline mechanism, such as the clutched driveline mechanism of FIG. 1, according to various embodiments.

Driveline 106 receives rotational power imparted to the input shaft 104 and transmitted through splitter gearbox 102 via output shaft 118, and then transfers it to a drive gearbox or other suitable mechanism that is coupled to a cutting blade assembly on a wing of the flex wing cutter. FIG. 2, discussed below, illustrates this arrangement. Driveline 106 may be equipped with one or more universal joints and/or constant velocity joints, and may be equipped with one or more telescoping portions, to facilitate folding of a flex wing section as well as movement and other flexing of the flex wing section during use. Such structures may be similar to corresponding structures employed on the implement driveline that attaches to the tractor PTO.

The end of driveline 106 that is engaged to output shaft 118, in the depicted embodiment, is coupled to clutch assembly 108, which selectively engages and disengages driveline 106 from output shaft 118. Clutch assembly 108, in the depicted embodiment, includes an actuator 110, a clutch fork 112, a clutch collar 114, and a mount weldment 116. In operation, actuator 110 can be actuated on demand to effect disengagement or engagement of the driveline 106 to output shaft 118 by clutch assembly 108.

Actuator 110, in the depicted embodiment, is coupled to clutch fork 112 at a first end and the mount weldment 116 at a second end. Clutch form 112 is pivotably coupled to the mount weldment 116 at an end distal from the end coupled to actuator 110, and is coupled to clutch collar 114 by a series of pins 120 extending from clutch collar 144, that slide within a series of slots 122 within the clutch fork 112. In operation, when actuated to disengage the clutch assembly 108, actuator 110 extends and causes the clutch fork 112 to pivot away from the splitter gearbox 102. As clutch fork 112 pivots away from the splitter gearbox 102, it imparts a linear motion to clutch collar 114 as the pins 120 each slide in their respective slots 122, which results in the clutch assembly 108 disengaging the driveline 106 from the output shaft 118. Conversely, when actuator 110 is actuated to engage the clutch assembly 108, actuator 110 retracts and causes the clutch fork 112 to pivot towards the splitter gearbox 102, in turn imparting a linear motion to clutch collar 114 to cause clutch assembly 108 to engage the driveline 106 to the output shaft 118.

Actuator 110, in the depicted embodiment, is a linear actuator, extending and retracting in a linear fashion based upon a remote signal. Actuator 110 may be electrically, pneumatically, or hydraulically powered, or may employ any other suitable technology now known or later devised that can supply sufficient force to effect engagement or disengagement of the clutch assembly 108. In other embodiments, actuator 110 may be rotary in motion and may secure to clutch assembly 108 at a pivot point, such as where clutch fork 112 is pivotably coupled to the mount weldment 116, or via a gear or gear train. In still other embodiments, actuator 110 may be configured to supply a different type or direction of motion. In further embodiments, actuator 110, clutch fork 112, and/or mount weldment 116 could be coupled to a stationary, viz. non-rotating portion of the driveline 106, rather than to splitter gearbox 102. It should be understood that actuator 110 may be of any configuration suitable to effect engagement or disengagement of the clutch assembly 108. In some embodiments, multiple actuators 110, of the same or of different types, may be employed.

Clutch fork 112, in the depicted embodiment, connects to an output shaft of the actuator 110 at a first end via a pivoting attachment point, and at the mount weldment 116 at a second pivoting attachment point. Although FIG. 1 only depicts one side of clutch fork 112, in the depicted embodiment clutch fork 112 straddles both sides of clutch collar 114 (as implied by its name, clutch fork 112), and is attached to mount weldment 116 on each side via a pivoting attachment point. In other embodiments, clutch fork 112 may only engage a single side of clutch collar 114. In some embodiments, clutch fork 112 may be configured to telescope, increasing in length to accommodate the changes in the geometry of clutch fork 112 as actuator 110 extends. As noted above, clutch fork 112 includes a plurality of elongated slots 122, through which pins 120 attached to clutch collar 114 extend and may slide. Other embodiments that implement clutch fork 112 in a different fashion may include additional structures or omit structures as appropriate for a given implementation.

Clutch collar 114 is secured to an end of driveline 106, and acts to effect engagement or disengagement of driveline 106 from output shaft 118. Clutch collar 114 may house internal components responsible for the mechanical connection between driveline 106 and output shaft 118, such as a universal or constant velocity joint, and is configured to transfer motion imparted from the clutch fork 112 to the internal components to alter the mechanical connection, viz. effect engagement or disengagement of the driveline 106. Clutch collar 114, in the depicted embodiment, includes a plurality of pins 120 to receive mechanical motion from clutch fork 112 via slots 122.

Mount weldment 116 is secured to splitter gearbox 102, and offers an immovable (relative to the driveline 106) point to pivotably affix one end of clutch fork 112. Mount weldment 116 is configured to position clutch fork 112 into an appropriate geometry so that actuator 110 can fully engage or disengage clutch assembly 108. The size and positioning of mount weldment 116 will vary depending upon the geometry of the other components of clutch assembly 108. Mount weldment 116, in some embodiments, may be formed as an integral part of the housing of splitter gearbox 102, or may be secured as a separate, discrete component. As noted above, in other embodiments, mount weldment 116 may be disposed upon or part of the assembly of driveline 106 that is stationary.

Each of the components of clutch assembly 108, discussed above, may be manufactured from steel, aluminum, composites, or a combination of materials suitable to durably withstand the stresses imposed in routine usage of the flex wing cutter, as well as the stress of repeated actuation of clutch assembly 108.

Turning to FIG. 2, an overhead diagram view of an example flex wing cutter 200 is depicted. Flex wing cutter 200 includes a mower or cutter deck 202, which is comprised of a center section 204, a left flex wing 206, and a right flex wing 208. As will be understood, center section 204 is generally maintained in an operating position for cutting while flex wing cutter 200 is hitched to a tractor. Left flex wing 206 and right flex wing 208 are each pivotably attached to the center section 204, such that each can be moved from an operating position, where each wing 206, 208, is substantially parallel to the plane defined by center section 204, to a lifted position, where each wing is tilted up out of the plane of the center section 204 and away from the surface being mowed, such as by selective actuation of a lift assembly 218a or 218b. Lift assemblies 218a and 218b, in the depicted embodiment, are each pivotably attached at one point to the center section 204, and at a second point to flex wing 206 and 208, respectively. In the depicted embodiment, each lift assembly 218 expands or contracts in a linear fashion which, coupled with the pivoting attachments, causes its respective wing 206 or 208 to pivot up and away from the plane defined by center section 204, towards center section 204.

When each wing 206 and 208 is in an operating position, a relatively wide cutting or mowing deck is provided, as the center section combines with either or both wings to cut a wide swath. The swath is narrowed when one of the wings 206 or 208 is in a lifted position, and when both wings are in a lifted position, only the center section remains to cut a narrower swath. A narrower swath may facilitate better negotiation and cutting of uneven terrain, as well as easier navigation around obstacles, particularly where the flex wing cutter 200 is wider than the tractor or other towing implement when both wings 206, 208 are in operating position. It should be understood that either or both of the flex wings 206 and 208 may be lifted away from operating position, for creating an operating cutting deck of various widths. The flex wings 206 and 208 may, in embodiments, be capable of being remotely moved between operating and lifted positions via command from a tractor cab, which may be in communication with the lift assemblies 218a and 218b, either electronically, hydraulically, mechanically, or in another suitable fashion.

As can be seen, flex wing cutter 200 includes a splitter gearbox 102, disposed upon the center section 204. Splitter gearbox 102 can include a drive shaft for connection to and operation of a cutting blade assembly for center section 204. Splitter gearbox 102 receives power from a driveline 212, which attaches between the PTO of a towing tractor and an input shaft (such as input shaft 104) on the splitter gearbox 102. Splitter gearbox 102 divides the rotational power transmitted through driveline 212 for rotation of drivelines 214a, 214b to each flex wing 206, 208, respectively. The drivelines for each flex wing run between the splitter gearbox 102 and drive gearboxes 210a, 210b, which in turn impart the rotational energy to each flex wing's cutting blade assembly. Each driveline 214a, 214b engages with the splitter gearbox 102 via a clutch assembly 108a, 108b, respectively. As discussed above, each clutch assembly 108 is configured to allow each driveline 214 to be selectively engaged or disengaged.

Each clutch assembly 108 is further connected to a remote control 216, depicted as a box in FIG. 2. The connection may be via electrical line, pneumatic line, hydraulic line, via radio or infrared control, or a combination of any of the foregoing. Specifically, in some embodiments remote control 216 may be connected to the actuators 110a, 110b of the clutch assemblies 108a, 108b, respectively. Remote control 216 may be located in a cab of the tractor or other towing vehicle. Remote control 216 can signal the actuators 110a, 110b in each clutch assembly to actuate, thereby effecting engagement or disengagement of either or both clutch assemblies 108a, 108b, as an operator of the flex wing cutter 200 requires.

Remote control 216, in some embodiments, may be a series of switches, which may be electric, hydraulic, mechanical, electro-mechanical, or another suitable technology, configured to directly actuate the various components of systems 100 and 200. In other embodiments, remote control 216 may be automated or computerized to some extent, such as using one or more microcontrollers. In still other embodiments, remote control 216 may be integrated into or provided as functionality from one or more other control systems of the tractor, such as part of an engine control unit or vehicle control unit. In some embodiments, remote control 216 may be in communication with one or more tractor control systems, such as via a CAN bus. Remote control 216 may be installed separately within the cab of the tractor, or in some embodiments, may be part of the existing controls within the tractor cab, such as where the tractor is pre-configured to work with a flex wing cutter equipped with a clutch assembly 108.

Furthermore, remote control 216 may also be in communication with a sensor (not shown) on each driveline 214a, 214b. The sensor may detect whether the driveline 214 is currently in rotation, and delay actuating the actuator 110 of each clutch assembly 108 until the driveline 214 is no longer rotating (zero speed). This delay can prevent damage to the output shaft 118, the clutch assembly 108, and/or the driveline 214 due to attempted engagement or disengagement of the clutch assembly 108 while the components are in motion. In such a configuration, the operator would first stop rotation of the tractor PTO to shut down the cutter, at which point it would be safe to disengage each wing, and raise each wing. The sensor may be any suitable sensor for detecting rotation, such as a hall effect sensor, rotary encoder, or another suitable detection technology.

In other possible embodiments, remote control 216 may be configured to automatically stop driveline 214 from rotation, such as by commanding the clutch assembly 108 to disengage from output shaft 118 automatically when an operator calls for the corresponding wing to be raised. Likewise, remote control 216 may be configured to automatically engage clutch assembly 108 to connect output shaft 118 when the corresponding wing has been lowered.

Figure 3:
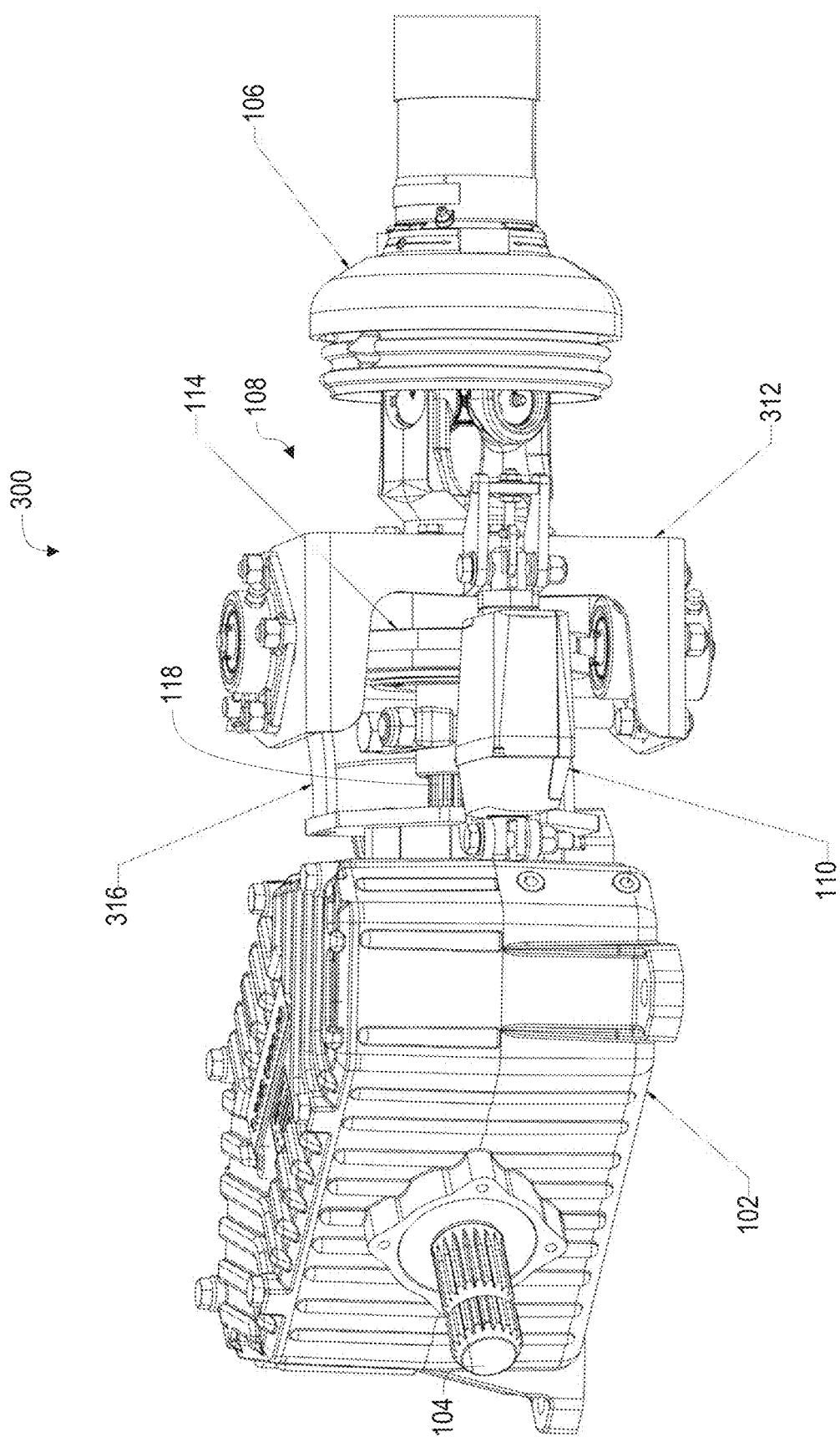
FIG. 3 illustrates a perspective view of a second clutched driveline mechanism for a flex wind cutter, in accordance with some possible embodiments.

FIG. 3 illustrates an alternative arrangement of the clutched driveline mechanism, mechanism 300, which has substantially the same components as mechanism 100 of FIG. 1. The corresponding components are indicated in FIG. 3 with the same call-outs as in FIG. 1, and the reader is directed to the description of the corresponding components provided in relation to FIG. 1, above. As can be seen in FIG. 3, the mount weldment 316 is now oriented to allow the linear actuator 110 to be placed on a side relative to splitter gearbox 102, rather than the top. Likewise, clutch fork 312 is mounted sideways relative to gearbox 102 to accommodate the different orientation of linear actuator 110. Further, as can be seen, clutch fork 312 does not secure to clutch collar 114 using a plurality of pins, but rather by a fixed rotational mount. Clutch mechanism 300 operates in a similar fashion to clutch mechanism 100, with actuator 110 extending to cause clutch fork 312 to rotate, which in turn causes the clutch collar 114 to release from output shaft 118. In the depicted embodiment, clutch collar 114 houses an engagement mechanism that is rotationally actuated, rather than by a linear or sliding motion, and so the components of clutch mechanism 300 are accordingly adjusted.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways.

This application is intended to cover any adaptations or variations of the embodiments discussed herein. Therefore, it is manifestly intended that embodiments be limited only by the claims and the equivalents thereof.

What is claimed is:

1. A tractor implement configured to be towed by a tractor, the tractor implement comprising:
   a gearbox comprising an input shaft and a output shaft;
   a mechanical clutch coupled to the gearbox;
   an actuator coupled to the mechanical clutch and positioned at the gearbox; and
   a driveline coupled to the gearbox via the mechanical clutch;
   wherein the actuator is controllable to move the mechanical clutch to selectively engage and disengage the output shaft with the driveline.

2. The tractor implement of claim 1, comprising a controller spaced apart from the actuator and configured to remotely control the actuator to move the mechanical clutch.

3. The tractor implement of claim 1, comprising an additional driveline coupled to the input shaft, wherein the additional driveline is configured to be coupled to a power take-off of the tractor.

4. The tractor implement of claim 1, wherein the actuator is electrically powered.

5. The tractor implement of claim 1, wherein the actuator is a rotary actuator.

6. The tractor implement of claim 1, wherein the actuator is pneumatically or hydraulically powered.

7. The tractor implement of claim 1, further comprising:
   an additional gearbox coupled to the driveline such that the driveline is between the gearbox and the additional gearbox; and
   a blade coupled to the additional gearbox, wherein the additional gearbox is configured to transfer rotational energy from the driveline to the blade.

8. The tractor implement of claim 7, further comprising a first deck segment and a second deck segment, the second deck segment configured to rotate relative to the first deck segment, wherein the gearbox is positioned at the first deck segment and the additional gearbox and the blade are positioned as the second deck segment.

9. The tractor implement of claim 1, wherein the mechanical clutch comprises:
   a mount weldment coupled to the gearbox and to the actuator at a first end of the actuator;
   a clutch fork coupled to the actuator at a second end of the actuator; and
   a clutch collar coupled to the clutch fork.

10. The tractor implement of claim 9, wherein actuation of the actuator pivots the clutch fork relative to the mount weldment, and wherein pivoting of the clutch fork moves the clutch collar.

11. The tractor implement of claim 1, comprising a controller configured to electronically communicate with the actuator.

12. A flex wing cutter, comprising:
a first deck;
a second deck rotatably coupled to the first deck;
a first gearbox positioned on the first deck;
a second gearbox positioned on the second deck;
a driveline extending from the first gearbox to the second gearbox;
a mechanical clutch coupled to the second gearbox; and
an actuator configured to move, independent of relative positions of the first deck and the second deck, the mechanical clutch such that actuation of the actuator selectively engages and disengages the driveline from the first gearbox.

13. The flex wing cutter of claim 12, further comprising a remote control configured to control the actuator.

14. The flex wing cutter of claim 13, wherein the remote control is configured to automatically stop the driveline from rotating by controlling the actuator in response to a user request to rotate the second deck relative to the first deck.

15. The flex wing cutter of claim 13, wherein the actuator is configured to receive radio or infrared signals from the remote control.

16. The flex wing cutter of claim 12, comprising a communication line coupled to the actuator and configured for providing a communication channel between the actuator and a control system of a tractor.

17. The flex wing cutter of claim 12, wherein the mechanical clutch comprises a clutch fork and a clutch collar, wherein the actuation of the actuator moves the mechanical clutch by rotating the clutch fork which causes the clutch collar to selectively release from or engage an output shaft of the first gearbox.

18. A mowing system, comprising:
a tractor; and
a flex wing cutter towed by the tractor, wherein the flex wing cutter comprises:
a first deck;
a second deck rotatably coupled to the first deck;
a first gearbox positioned on the first deck;
a second gearbox positioned on the second deck;
a driveline extending from the first gearbox to the second gearbox;
a mechanical clutch coupled to the first gearbox; and
an actuator configured to move, independent of relative positions of the first deck and the second deck, the mechanical clutch such that actuation of the actuator selectively engages and disengages the driveline from the first gearbox.

19. The mowing system of claim 18, wherein the tractor comprises a power take-off and wherein the flex wing cutter comprises an additional driveline extending from the power take-off to an input shaft of the first gearbox, wherein the mechanical clutch is positioned at an output shaft of the first gearbox.

20. The mowing system of claim 18, wherein the tractor comprises a control system configured to control the actuator.

* * * * *